United States Patent Office 3,396,197
Patented Aug. 6, 1968

3,396,197
HEPTAFLUOROPROPYL DIPHENYLPHOSPHINE
AND THE PREPARATION THEREOF
Clay M. Sharts, San Diego, Calif., assignor to the United States of America as represented by the Secretary of the Navy
No Drawing. Filed Oct. 6, 1965, Ser. No. 493,584
2 Claims. (Cl. 260—606.5)

The invention herein described may be manufactured and used by or for the Government of the United States of America for governmental purposes without the payment of any royalties thereon or therefor.

This invention relates to high-temperature-stable polymers and more particularly to the compound heptafluoropropyldiphenylphosphine.

The compound, heptafluoropropyldiphenylphosphine as described herein is prepared from heptafluoropropyl iodide and lithium diphenylphosphide, and is useful in endcapping azide-terminated polymers derived from phosphonitrilic starting materials such as diazidohexaphenylphosphonitrile tetramer and bisphosphines. This compound reacts with end group azide at the ends of polymer chains to give the polymer added thermal and chemical stability. Endcapping is important to achieve the maximum chemical and thermal stability in the polymers formed from diazides and bis-phosphines. Heptafluoropropyldiphenylphosphine is a superior endcapping group, in forming high-temperature-stable polymers, because of the added stability of the heptafluoropropyl group. The derived polymers are useful as laminating agents, coatings, adhesives, and resins which are thermally stable and capable of withstanding temperatures far in excess of those where conventional known polymers fail.

It is an object of the invention to provide a compound for giving azide-terminated polymers added thermal and chemical stability.

Another object of the invention is to provide an important compound in forming high-temperature-stable polymers.

A further object of the invention is to provide a superior endcapping compound for achieving maximum chemical and thermal stability in polymers formed from diazides and bis-phosphines.

Other objects and many of the attendant advantages of this invention will become readily appreciated as the same becomes better understood by reference to the following detailed description.

The compound heptafluorophopyldiphenylphosphine is prepared from heptafluoropropyl iodide and lithium diphenylphosphide.

The preparation of heptafluoropropyldiphenylphosphine is unique in that this is the first known coupling of a perfluoroalkyl halide and metallophosphine derivative. Previous couplings have been with normal alkyl halides.

Heptafluoropropyldiphenylphosphine was prepared as described below:

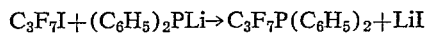

Tetrahydrofuran (300 ml., Fischer certified) was distilled from solid lithium aluminum hydride under oxygen-free anhydrous conditions onto a solid mixture of 2.84 g. (0.41 mole) of lithium and 52.44 g. (0.20 mole) of triphenylphosphine (recrystallized from ethanol). The reaction vessel was cooled by a room-temperature water bath. After 4 hr. nearly all the lithium had dissolved; the small residual lithium floated on the surface of a deep-crimson solution and was mechanically removed. To the red solution 18.51 g. (0.20 mole) of t-butyl chloride (dried over calcium hydride) was slowly added; the exothermic reaction was controlled by cooling the reaction vessel in a water bath at room temperature.

To this solution, cooled in an ice bath, was added with stirring 120.0 g. (0.399 mole) of freshly distilled heptafluoropropyl iodide. The reaction mixture was allowed to stand at room temperature overnight (approx. 16 hours). Tetrahydrofuran was distilled off; excess heptafluoropropyliodide distilled with the tetrahydrofuran as an azeotrope, B.P. 58–60° C. When all the heptafluoropropyliodide was distilled off, the boiling point increased to 66° C., whereupon 300 ml. of carbon tetrachloride was added and distillation continued until the boiling point of carbon tetrachloride was reached. The resulting mixture was filtered and the carbon tetrachloride layer distilled. After removal of carbon tetrachloride by distillation the residue distilled in three portions:

(1) Yellow liquid, B.P. 52–60° C./1 mm.
(2) Red liquid, B.P. 60–90° C./1 mm.
(3) Red liquid, B.P. 90–97° C./1 mm.

The first fraction contained methylene hydrogen, according to its N.M.R. spectrum. The N.M.R. spectrum of the third fraction was almost free of methylene-proton absorption.

Redistillation of the third fraction gave a yellow oil (B.P. 94–95° C./1 mm., $n_D^{25}$ 1.5056), which was identified as the desired product, heptafluoropropyldiphenylphosphine.

The infrared spectra of the product showed intense carbon-fluorine absorptions at 7.5, 8.2, 8.3, 8.5, and 9.0 microns, as well as the other expected absorptions. The proton N.M.R. spectrum had the expected phenyl-hydrogen absorptions and showed the product to be almost free of a methylene-group-containing lower boiling impurity. The fluorine N.M.R. spectrum confirmed the presence of three kinds of fluorine in a ratio of 3:2:2, as expected for a heptafluoropropyl group.

Analysis.—Calcd. for $C_{15}H_{10}F_7P$: C, 50.863; H, 2.846; F, 37.547; P, 8.744. Found: C, 51.02; H, 3.00; F, 37.55; P, 8.48.

Obviously many modifications and variations of the present invention are possible in the light of the above teachings. It is therefore to be understood that within the scope of the appended claims the invention may be practiced otherwise than as specifically described.

What is claimed is:
1. The compound $C_3F_7P(C_6H_5)_2$.
2. The process for producing heptafluoropropyldiphenylphosphine, comprising:
(a) reacting under anhydrous conditions substantially one molar part triphenylphosphine with two molar parts lithium metal in a tetrahydrofuran solution,
(b) slowly adding substantially one molar part t-butylchloride while controlling the exothermic reaction,
(c) adding substantially two molar parts heptafluoropropyl iodide while cooling the reaction mixture at about 5° C., and allowing the mixture to stand about 16 hours,
(d) distilling off the tetrahydrofuran and unreacted heptafluoropropyl iodide,
(e) adding carbon tetrachloride and continuing the distillation until the boiling point of carbon tetrachloride is reached,
(f) filtering the reaction mixture, and removing the carbon tetrachloride by distillation leaving a residue,

(g) continuing distillation of the residue under reduced pressure to yield a fraction having a boiling point of 90–97° C./1 mm., and further re-distillation to yield heptafluorodiphenylphosphine as a yellow oil having a boiling point of 94–95° C./1 mm.

References Cited

UNITED STATES PATENTS 3,099,690   7/1963   Rauhut et al. _____ 260—606.5

OTHER REFERENCES

Arden, Sidney: Chem. Abstracts, vol. 53 (1959), p. 9038(b).

Lueddemann, P.: Chem. Abstracts, vol. 57 (1962), p. 9877(F).

TOBIAS E. LEVOW, *Primary Examiner.*

W. F. W. BELLAMY, *Assistant Examiner.*